W. H. ORTLIP.
Fish-Drain for Casks.
No. 205,128.　　　Patented June 18, 1878.
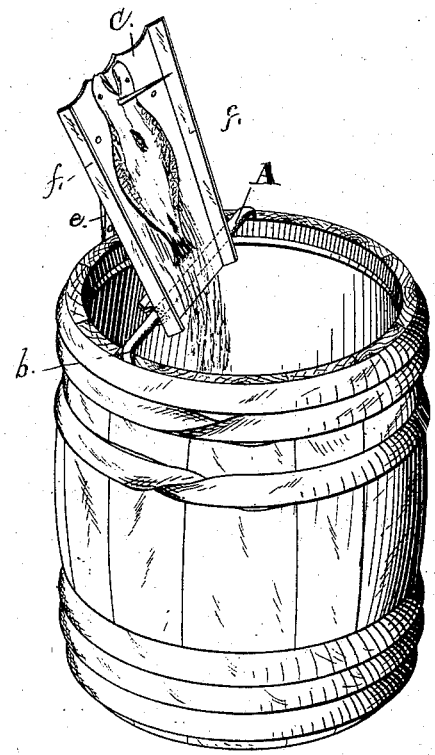
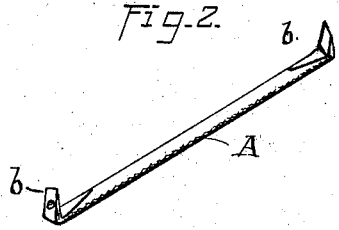
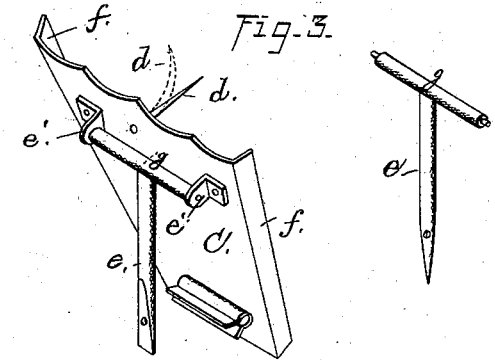
WITNESSES
Jas. E. Hutchinson
Penn Halsted
INVENTOR
William H. Ortlip
by J. S. Halsted
his Atty.

UNITED STATES PATENT OFFICE.

WILLIAM H. ORTLIP, OF NORRISTOWN, PENNSYLVANIA.

IMPROVEMENT IN FISH-DRAINS FOR CASKS.

Specification forming part of Letters Patent No. 205,128, dated June 18, 1878; application filed June 5, 1878.

*To all whom it may concern:*

Be it known that I, WILLIAM H. ORTLIP, of Norristown, in the county of Montgomery and State of Pennsylvania, have invented certain new and useful Improvements in Fish-Drains or Drain Attachments for Casks and Barrels containing salt fish, mackerel, salt meats, or similar articles; and I do hereby declare that the following is a full, clear, and exact description thereof, which will enable others skilled in the art to which it appertains to make and use the same, reference being had to the accompanying drawings, and to letters of reference marked thereon, which form a part of this specification.

Retail grocers and others experience much inconvenience, lack of cleanliness, and loss of brine in lifting a fish or piece of salt meat from the brine in a cask in handling it or exposing it to view.

The customary mode is to lift the fish or meat out of the brine, and then either to hold it above the brine to drip, or to lay it on a board placed over a part of the top of the open barrel. This allows the liquid brine to spread and waste by running off upon the floor, and makes all the surrounding floor untidy and offensive.

The object of my invention is to avoid these and all other objections of like character by providing a novel device readily attachable to and detachable from the barrel or vessel containing the fish or other salted article, and which is also adapted to hold it suspended as long as desired above the brine, and to insure that all the liquid drained off from it shall be guided back into the cask, making the operation at once simple and perfectly tidy, sightly, and inoffensive to the eye.

To effect these objects my invention consists of a bar, A, to extend across the barrel, and provided with thin or wedging bent ends $b\ b$, each adapted to be inserted between the top of the staves and the hoops which surround them in a chute or trough, C, having a pin or hook, $d$, (either straight or bent,) to hold a fish or other article which may be lifted from the brine, a means of ready attachment of this chute to the bar, and a leg, $e$, or support for the chute, such leg being adapted at its lower end for insertion between the staves and one or more of the barrel-hoops.

In the drawings, Figure 1 represents all the parts of my invention applied to a cask, and with a fish suspended on its hook while being drained; Fig. 2, the bar A detached; and Fig. 3, the chute or drain-trough detached, showing its rear or under side.

The chute is made broader at its top than at its bottom, and has side walls or ledges $f\ f$ to confine the fish and brine between them and prevent any dripping at the sides, the bottom of the trough being narrower than that part of the cask into which it is to guide and discharge the falling brine. The hook or pin $d$ should be placed near its upper or broader part as its most convenient location. The back of the chute or drain-piece I furnish with a spring-clasp, $g$, or clasps of any suitable kind adapted to clasp the bar A when applied thereto, and thus serve to support the chute thereon; and it is also furnished with a swinging leg, $e$, which supports the chute in the desired inclined position, and which leg, as before stated, is itself sustained by the barrel. The leg $e$ is shown as T-shaped, its upper part being journaled in brackets or projections $e'$ on the back of the chute; but it may be hinged or otherwise attached, and it may be straight, curved, or of any desired shape.

The two ends $b\ b$ of the cross-bar A and the lower end of the leg $e$ I provide with a hole, whereby they may be severally secured by means of a screw or nail to any barrel or vessel which has no upper hoop or hoops. Such hole in the leg $e$ also admits of lowering the upper end of the chute and of adjusting it to any desired inclination. The bar or rod A is preferably of a length less than the diameter of the cask or vessel, in order that the chute may cover as little of the cask as practicable, and afford ample room for lifting the fish out of the cask.

The device or its parts may be made of any desired material, metallic or otherwise, and may be painted, japanned, or otherwise finished, as taste may demand. It is applicable for all purposes where it is desired to lift a solid article or provisions from liquids.

When the brine or liquid in a cask is low, the bar A of itself affords a means for suspending and draining the fish by means of any rod having a hook to lift out the fish, and another hook to hang upon the bar and in such case the chute can be used at the same time with another similar bar on another and fuller vessel.

The spring-clasp permits the shifting of the chute upon the bar to either side of the barrel, to suit the convenience or position of the person using it, and the adjustability of the leg allows of sustaining it in that position, and its point may be tapering or pin-pointed.

I claim—

1. The fish or provision drain, consisting of the combination of a rod or bar, A, and a chute, C, provided with a pin or hook on its front and a supporting-leg at its rear, substantially as shown and described.

2. The chute C, as made with side walls or guards f, the pin or hook d, and a spring-clasp, all substantially as and for the purposes described.

3. In combination with the chute, a pivoted or swinging leg at its rear, having its lower end sharp-pointed or wedge-shaped, and provided with a screw or nail hole, substantially as and for the purposes described.

4. The bar or rod A, as made of a length less than the diameter of the cask to which it is to be applied, and with the two bent and sharpened or wedge-shaped ends, adapted to be forced between the staves and hoop of a cask.

WILLIAM H. ORTLIP.

Witnesses:
GEO. M. ROGERS,
HENRY B. GARBER.